(12) United States Patent
Harris et al.

(10) Patent No.: US 8,314,507 B2
(45) Date of Patent: Nov. 20, 2012

(54) HYDRO UNIT RETROFIT AND METHOD OF PERFORMING SAME

(75) Inventors: William D. Harris, Neshkoro, WI (US); Jeff Kiser, Vulcan, MI (US)

(73) Assignee: Kiser Hydro, LLC, Norway, MI (US)

( * ) Notice: Subject to any disclaimer, the term of this patent is extended or adjusted under 35 U.S.C. 154(b) by 288 days.

(21) Appl. No.: 12/764,440

(22) Filed: Apr. 21, 2010

(65) Prior Publication Data

US 2011/0260456 A1    Oct. 27, 2011

(51) Int. Cl.
F03B 13/00    (2006.01)
(52) U.S. Cl. .......................... 290/54; 290/43
(58) Field of Classification Search .............. 290/54, 290/43; 415/116, 2.1, 3.1, 1; 60/398
See application file for complete search history.

(56) References Cited

U.S. PATENT DOCUMENTS

| | | | |
|---|---|---|---|
| 3,614,268 A | 10/1971 | Merenda | |
| 3,785,747 A | 1/1974 | Mayo, Jr. | |
| 4,017,211 A | 4/1977 | Alestig et al. | |
| 4,089,617 A | 5/1978 | Koeller | |
| 4,090,809 A | 5/1978 | Kepler | |
| 4,201,925 A | 5/1980 | Kuwabara et al. | |
| 4,277,221 A | 7/1981 | Kanger | |
| 4,321,475 A * | 3/1982 | Grub ............................. | 290/52 |
| 4,380,401 A | 4/1983 | Chacour et al. | |
| 4,412,779 A | 11/1983 | Tsunoda et al. | |
| 4,441,029 A | 4/1984 | Kao | |
| 4,537,558 A | 8/1985 | Tsunoda et al. | |
| 4,538,957 A | 9/1985 | Yamagata et al. | |
| 4,588,352 A | 5/1986 | Kako | |
| 4,610,599 A | 9/1986 | Long | |
| 4,648,244 A | 3/1987 | Mayo, Jr. et al. | |
| 4,674,279 A | 6/1987 | Ali et al. | |
| 4,780,051 A | 10/1988 | Fisher, Jr. | |
| 4,787,815 A | 11/1988 | Weyh | |
| D305,638 S | 1/1990 | Mardikian | |
| 4,932,347 A | 6/1990 | Mardikian | |
| 4,955,789 A | 9/1990 | Chacour et al. | |
| 5,213,694 A | 5/1993 | Craig | |
| 5,228,830 A | 7/1993 | Pastore | |

(Continued)

OTHER PUBLICATIONS

Wikipedia, Water Turbine, http://en.wikipedia.org/wiki/Water-turbine; printed Mar. 6, 2010.

*Primary Examiner* — Tho D Ta
(74) *Attorney, Agent, or Firm* — Michael Best & Friedrich LLP

(57) ABSTRACT

A turbine replacement unit for replacement of at least one double runner horizontal submersible installation for a hydroelectric plant including at least one submerged coupling and at least one submerged bearing supported by a submerged bearing pedestal in which each of the two runners discharge a flow into a common draft tube. The replacement unit includes a single runner positioned to replace each of the two runners, the single runner receiving a flow and discharging the flow into the existing common draft tube. A dry pit assembly is positioned to surround the submerged pedestal and define an air space around the submerged pedestal and an oil-flooded bearing is positioned on the pedestal to replace the submerged bearing. A shaft supports the runner for rotation and is at least partially supported for rotation by the oil-flooded bearing. A generator is coupled to the shaft and is operable to produce an electrical power in response to rotation of the shaft.

17 Claims, 5 Drawing Sheets

U.S. PATENT DOCUMENTS

| | | | |
|---|---|---|---|
| 5,346,359 A | 9/1994 | Propst | |
| 5,372,005 A | 12/1994 | Lawler | |
| 5,388,612 A | 2/1995 | Cerola et al. | |
| D358,200 S | 5/1995 | Cerola | |
| 5,436,507 A | 7/1995 | Brown et al. | |
| 5,441,384 A | 8/1995 | Gokhman | |
| 5,447,494 A | 9/1995 | Dorsey, III | |
| 5,487,649 A | 1/1996 | Dorsey, III et al. | |
| 5,754,446 A | 5/1998 | Fisher, Jr. et al. | |
| 5,780,935 A | 7/1998 | Kao | |
| 5,823,740 A | 10/1998 | Cybularz et al. | |
| 5,825,094 A | 10/1998 | Hess | |
| 5,864,183 A | 1/1999 | Fisher, Jr. et al. | |
| 5,879,130 A | 3/1999 | Beyer et al. | |
| 5,896,657 A | 4/1999 | Beyer et al. | |
| 5,905,311 A | 5/1999 | Hess et al. | |
| 5,924,842 A | 7/1999 | Beyer et al. | |
| 5,924,844 A | 7/1999 | Cybularz et al. | |
| 5,941,682 A | 8/1999 | Cybularz et al. | |
| 5,947,679 A | 9/1999 | Cybularz et al. | |
| 5,954,474 A | 9/1999 | Fisher, Jr. et al. | |
| 6,016,600 A | 1/2000 | Kennell et al. | |
| 6,038,494 A | 3/2000 | Fisher, Jr. et al. | |
| 6,095,749 A | 8/2000 | Beyer et al. | |
| 6,152,684 A | 11/2000 | Ferme et al. | |
| 6,155,783 A | 12/2000 | Beyer | |
| 6,164,907 A | 12/2000 | Cybularz et al. | |
| 6,225,564 B1 | 5/2001 | Theodorides | |
| 6,239,505 B1 | 5/2001 | Kao | |
| 6,247,893 B1 | 6/2001 | Beyer et al. | |
| 6,254,339 B1 | 7/2001 | Fisher, Jr. et al. | |
| 6,313,545 B1 | 11/2001 | Finley et al. | |
| 6,402,477 B1 | 6/2002 | Cybularz et al. | |
| 6,454,533 B2 | 9/2002 | Beyer | |
| 6,524,063 B1 | 2/2003 | Beyer et al. | |
| 6,533,536 B1 | 3/2003 | Fisher, Jr. et al. | |
| 6,559,554 B2 | 5/2003 | Finley et al. | |
| 6,722,934 B2 | 4/2004 | Roos | |
| 6,729,843 B1 | 5/2004 | Nichtawitz et al. | |
| 6,841,893 B2 | 1/2005 | Maiwald et al. | |
| 6,864,596 B2 | 3/2005 | Maiwald et al. | |
| 6,918,744 B2 | 7/2005 | Gokhman | |
| 6,926,494 B2 | 8/2005 | Sabourin | |
| 6,965,816 B2 | 11/2005 | Walker | |
| 6,971,843 B2 | 12/2005 | Desy et al. | |
| 7,004,637 B1 | 2/2006 | Uyama et al. | |
| 7,035,718 B2 | 4/2006 | Jensen et al. | |
| 7,044,452 B2 | 5/2006 | Demers et al. | |
| 7,072,744 B2 | 7/2006 | Kuwabara | |
| 7,092,795 B2 | 8/2006 | Kuwabara | |
| 7,114,918 B2 | 10/2006 | Coulson et al. | |
| 7,132,759 B2 | 11/2006 | Alstot et al. | |
| 7,210,904 B2 | 5/2007 | Chandraker | |
| 7,239,037 B2 | 7/2007 | Alstot et al. | |
| 7,329,962 B2 | 2/2008 | Alstot et al. | |
| 7,341,424 B2 | 3/2008 | Dial | |
| 7,352,074 B1 * | 4/2008 | Pas | 290/43 |
| 2011/0084490 A1 * | 4/2011 | Knox | 290/54 |

* cited by examiner

HYDRO UNIT RETROFIT AND METHOD OF PERFORMING SAME

BACKGROUND

The present invention relates to a hydro turbine retrofit, and more particularly to a system and method for retrofitting a multi-runner hydro unit.

Hydro turbines are used to generate electricity and control the flow of water on rivers throughout the world. Older hydro stations and particularly stations that include multi-runner units are subject to control difficulties and inefficiencies due to the arrangement of the controls and the flow through the various runners.

SUMMARY

In one construction, the invention provides a turbine replacement unit for replacement of at least one double runner horizontal submersible installation for a hydroelectric plant including at least one submerged coupling and at least one submerged bearing supported by a submerged bearing pedestal in which each of the two runners discharge a flow into a common draft tube. The replacement unit includes a single runner positioned to replace each of the two runners, the single runner receiving a flow and discharging the flow into the existing common draft tube. A dry pit assembly is positioned to surround the submerged pedestal and define an air space around the submerged pedestal and an oil-flooded bearing is positioned on the pedestal to replace the submerged bearing. A shaft supports the runner for rotation and is at least partially supported for rotation by the oil-flooded bearing. A generator is coupled to the shaft and is operable to produce an electrical power in response to rotation of the shaft.

In another construction, the invention provides a turbine replacement unit for replacement of a horizontal submersible unit for a hydroelectric plant wherein the unit includes at least two double runners including synchronized wicket gates, the runners supported on a preexisting foundation and coupled to a common shaft supported by at least two submerged bearings supported by a first submerged bearing pedestal and a second submerged bearing pedestal in which a first existing runner and a second existing runner discharge into a first draft tube and a third existing runner and a fourth existing runner discharge into a second draft tube. The replacement unit includes a first dry pit assembly positioned around the first bearing pedestal and defining an air space around the first bearing pedestal and a first oil-flooded bearing positioned on the pedestal to replace one of the submerged bearings. A first replacement runner assembly is connected to the first dry pit and includes an inlet positioned to receive a first flow and an outlet positioned to discharge the first flow into the first draft tube. The first flow is the only flow into the first draft tube. The first replacement runner assembly includes a first replacement runner. A second dry pit assembly is positioned around the second bearing pedestal and defines an air space around the second bearing pedestal and a second oil-flooded bearing is positioned on the pedestal to replace the other of the submerged bearings. A second replacement runner assembly is connected to the second dry pit and includes an inlet positioned to receive a second flow and an outlet positioned to discharge the second flow into the second draft tube. The second flow is the only flow into the second draft tube. The second replacement runner assembly includes a second replacement runner. A shaft supports the first replacement runner and the second replacement runner for rotation and is at least partially supported for rotation by the first oil-flooded bearing and the second oil-flooded bearing. A generator is coupled to the shaft and is operable to produce an electrical power in response to rotation of the shaft.

In another construction, the invention provides a method of replacing a horizontal submersible installation for a hydroelectric unit including at least two double runners including synchronized wicket gates, the runners supported on a preexisting foundation and coupled to a common shaft supported by at least two submerged bearings supported by a first submerged bearing pedestal and a second submerged bearing pedestal in which a first existing runner assembly and a second existing runner assembly discharge into a first draft tube and a third existing runner assembly and a fourth existing runner assembly discharge into a second draft tube. The method includes removing the first existing runner assembly and the second existing runner assembly, positioning a first dry pit assembly around the first submerged bearing pedestal to produce an air space around the first submerged bearing pedestal, and connecting a first new runner assembly including a first new runner to the first dry pit assembly. The first new runner assembly is arranged to receive a first flow and discharge the first flow into the first draft tube, the first flow being the only flow into the first draft tube. The method also includes positioning a first oil-flooded bearing on the first bearing pedestal, removing the third existing runner assembly and the fourth existing runner assembly, and positioning a second dry pit assembly around the second submerged bearing pedestal to produce an air space around the second submerged bearing pedestal. The method further includes connecting a second new runner assembly including a second new runner to the second dry pit assembly, the second new runner assembly arranged to receive a second flow and discharge the second flow into the second draft tube, the second flow being the only flow into the second draft tube. The method also includes positioning a second oil-flooded bearing on the second bearing pedestal, supporting the first new runner and the second new runner on a shaft, and supporting the shaft on the first oil-flooded bearing and the second oil-flooded bearing.

In another construction, the method includes a turbine replacement unit for replacement of a horizontal submersible installation for a hydroelectric plant including at least two opposed double runners including synchronized wicket gates, a first existing runner and a second existing runner discharge flow into a first draft tube, and a third existing runner and a fourth existing runner discharge flow into a second draft tube. The replacement unit includes a first dry pit assembly, a second dry pit assembly, and a first replacement runner assembly connected to the first dry pit assembly and including an inlet positioned to receive a first flow and an outlet positioned to discharge the first flow into the first draft tube, the first flow being the only flow into the first draft tube, the first replacement runner assembly including a first replacement runner. A second replacement runner assembly is connected to the second dry pit assembly and includes an inlet positioned to receive a second flow and an outlet positioned to discharge the second flow into the second draft tube, the second flow being the only flow into the second draft tube, the second replacement runner assembly including a second replacement runner. A first series of wicket gates are positioned adjacent the first replacement runner and are operable to control the first flow into the first replacement runner and a second series of wicket gates are positioned adjacent the second replacement runner and are operable to control the second flow into the second replacement runner. The first series of wicket gates and the second series of wicket gates are movable independent of one another.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
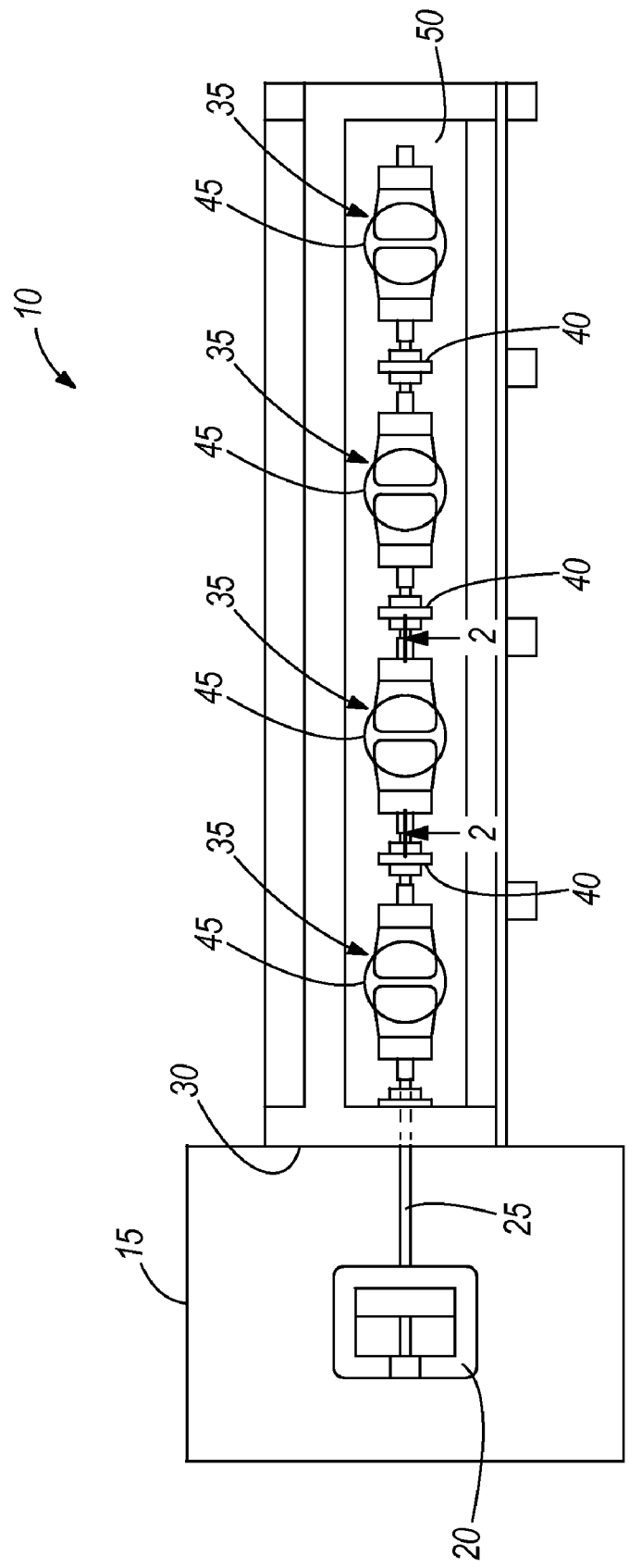
FIG. 1 is a top schematic view of a hydro power unit including four double opposed runner horizontal submerged turbines.

FIG. 1 illustrates an existing arrangement for a portion of hydro electric plant 10. The illustrated arrangement includes a power house 15 that is constructed as part of or adjacent to a dam on a river or stream. The power house 15 contains a generator 20, controls, switch gear, and other equipment that must be kept dry or that must be frequently maintained.

A shaft 25 is connected to the generator 20 at one end and extends through a wall 30 of the power house 15. In the illustrated construction, the shaft 25 extends to and interconnects four double opposed runner horizontal submerged turbines 35. Thus, the arrangement illustrated in FIG. 1, includes eight runners 23 (shown in FIG. 2) connected to a common shaft 25 that is connected to the single generator 20. In preferred arrangements, several shaft segments are connected to one another using bolted couplings 40 to allow for easier assembly, disassembly, and maintenance. As one of ordinary skill will realize, arrangements exist with many different runner configurations. However, the invention described herein is particularly suited to double opposed horizontal runner arrangements and more particularly to arrangements that include multiple double opposed horizontal runner turbines 35.

With continued reference to FIG. 1, each of the double opposed runner horizontal submerged turbines 35 discharges flow into a centrally-located draft tube 45. Thus, each draft tube 45 receives flow from two different runners 23 or turbines.

The submerged turbines 35 are supported on a submerged turbine deck 50 that includes apertures 55 formed to receive the draft tubes 45 and to direct the flow to a tailrace or other discharge. A number of bearing pedestals 60 are supported by the turbine deck 50 and provide a stable platform to support shaft radial bearings 65. In the illustrated construction, the pedestals 60 and bearings 65 operate while submerged in water. Thus, the use of oil-flooded bearings is prohibited. Rather, sacrificial bearings such as wood bearings are often employed. This bearing arrangement generally requires significant maintenance and frequent realignment to function properly. If the frequent realignments are not performed or are not performed properly, premature shaft failure and other problems can occur.

In addition to the radial bearings 65, a thrust bearing (not shown) is positioned at some point along the length of the shaft 25 to accommodate the thrust load produced by the operation of the runners 23 or turbines. While the illustrated system 10 is substantially balanced and would ideally produce little or no thrust, a thrust bearing is still required.

Figure 2:
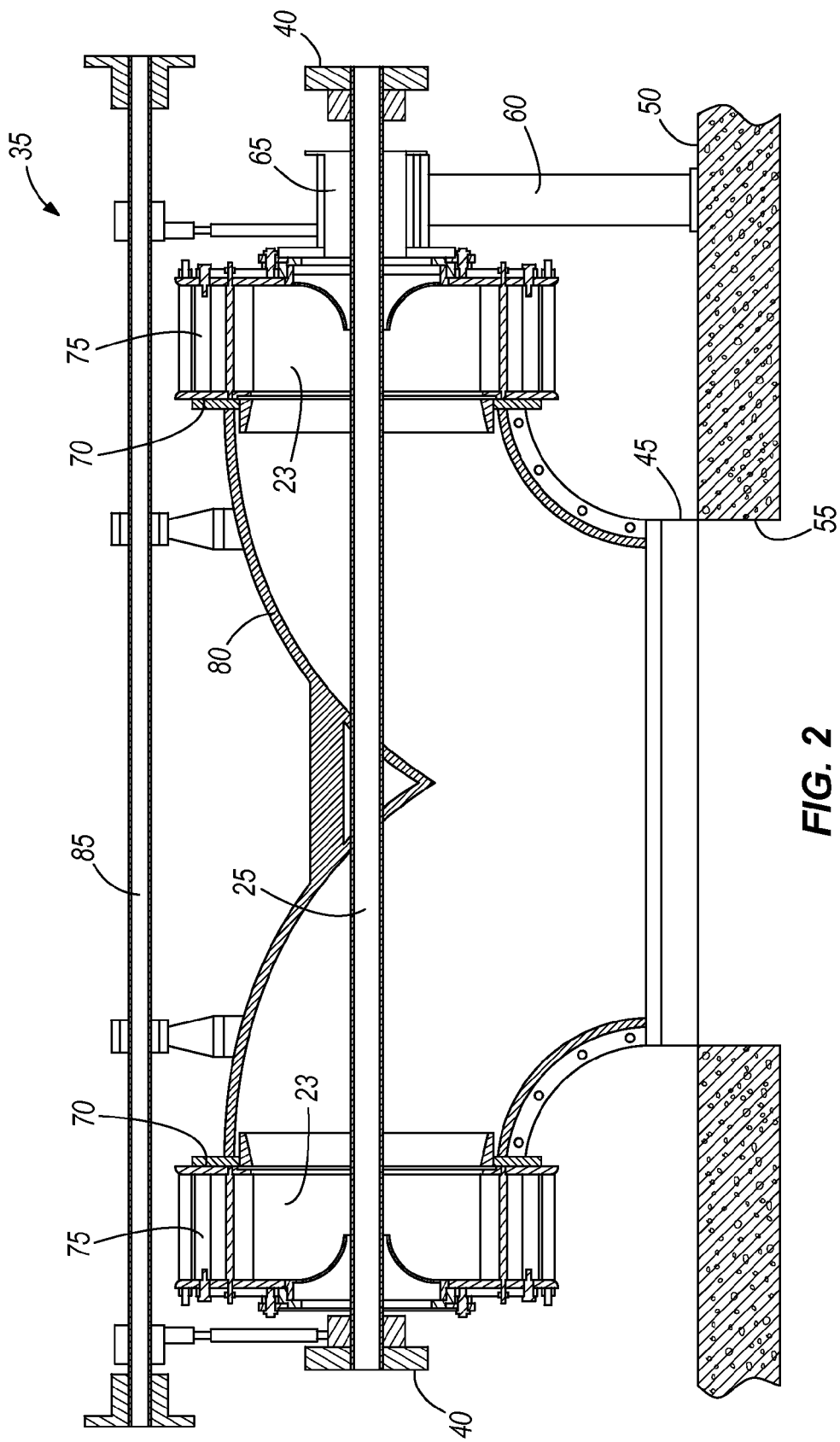
FIG. 2 is a side view of one of the double opposed runner horizontal submerged turbines of FIG. 1.

FIG. 2 is a section view of one of the double opposed runner horizontal submerged turbines 35 of FIG. 1 and is representative of each of the double opposed runner horizontal submerged turbines 35 of FIG. 1. Each of the turbines 35 includes a runner 23 (sometimes referred to as a turbine) arranged to receive an inlet flow of water around the outer circumference and in a substantially radial flow direction and to discharge the flow of water from the center in a substantially axial direction. The runner 23 is attached to the shaft 25 for rotation such that as the runner 23 rotates, rotational torque is applied to the shaft 25 to rotate the generator 20. The illustrated runner 23 is a Z-type Leffel turbine or a Francis turbine. However, other types of turbines could be employed if desired (e.g., Kaplan, Propeller, etc.).

A gate casing 70 surrounds the outer circumference of the runner 23 and supports a plurality of movable wicket gates 75. The wicket gates 75 can be moved from a closed position to a full open position to control the quantity of flow through the runner 23.

A draft chest 80 attaches to the gate casing 70 and directs the water from the discharge of the runner 23 to the draft tube 45 below. As illustrated in FIG. 2, both runners 23 discharge flow toward one another and into the common draft chest 80 that then directs that flow to the draft tube 45 and out through the tail race of the dam.

A governor shaft 85 extends above the runners 23 and is supported by a series of bearings 65. As with the shaft 25, the governor shaft 85 is preferably assembled from a number of shaft segments to simplify assembly, disassembly, and maintenance. The governor shaft 85 extends the full length of the various runners 23 and controls each set of wicket gates 75 for each runner 23. Thus, a single control system positions all of the wicket gates 75 in substantially the same position during operation. In preferred constructions, a sensor senses the speed and/or load of the generator 20 and adjusts the wicket gate position to adjust that speed or load to a desired set point.

Figure 3:
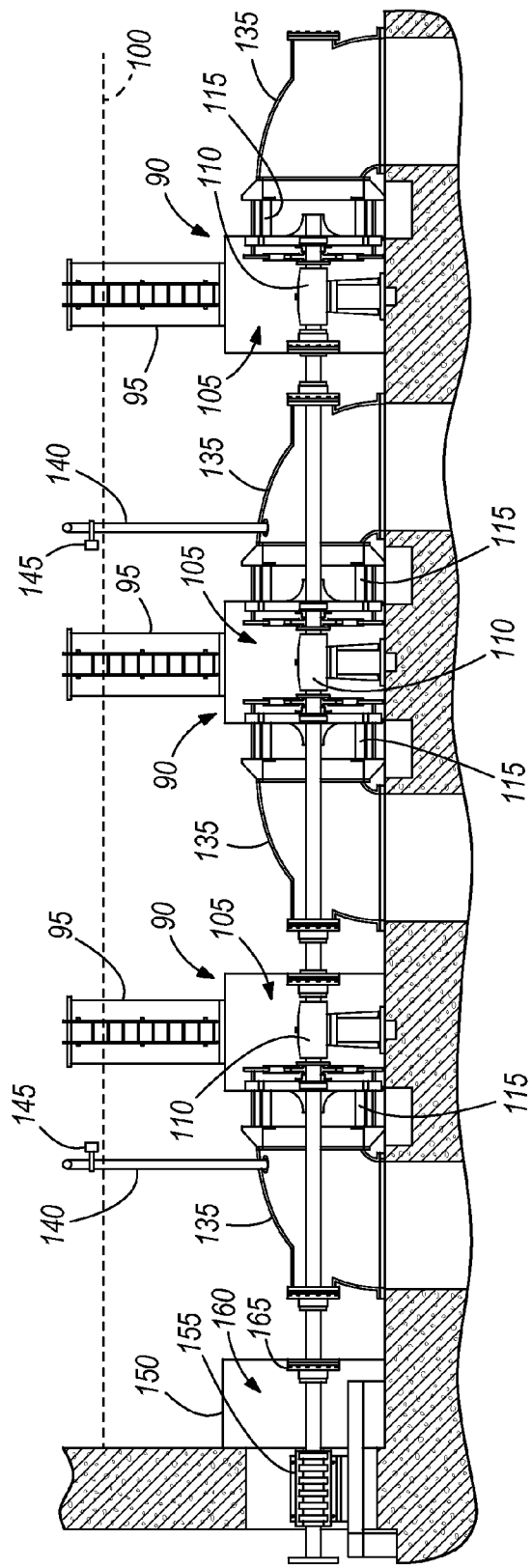
FIG. 3 is a side view of a replacement unit suitable to replace the hydro power unit of FIG. 1 and embodying the invention.

FIG. 3 is a view of the turbine deck 50 of FIG. 1 following the implementation of the present invention. As can be seen, there are no significant structural changes to the turbine deck 50, the power house 15 or any foundations. Rather, the present invention is installed using these existing features. For example, the pre-existing draft tube apertures 55 remain unchanged following the implementation of the present invention.

Figure 4:
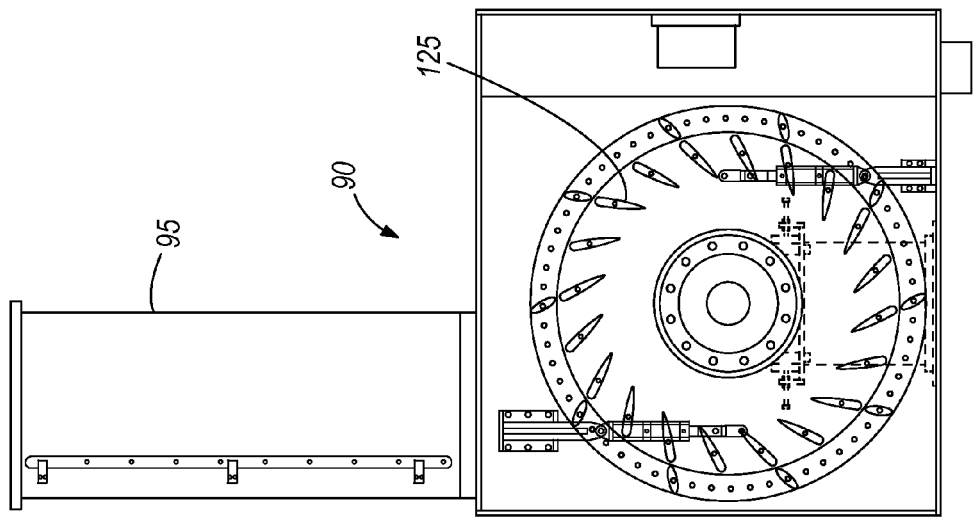
FIG. 4 is a side view of a dry pit suitable for use in the replacement unit of FIG. 3.

Three dry pit assemblies 90 similar to the one illustrated in FIG. 4 are positioned on the turbine deck 50 with each dry pit assembly 90 surrounding one of the bearing pedestals 60. The dry pit assemblies 90 include an egress tunnel 95 that extends above a high water line 100 and provides access to the interior of the dry pit 90 during operation. Each of the dry pits 90 thus defines an air space 105 around the bearing 65 that is accessible during operation.

With the pedestal 60 now positioned in an air environment, the existing sacrificial bearing 65 can be replaced with a fluid bearing 110 and preferably with an oil-flooded bearing 110 such as an oil-flooded babbitted bearing 110. The use of oil-flooded bearings 110 greatly reduces the maintenance requirements and increases the life of the bearings 110 and the shafts 25. In addition, if necessary, maintenance can be performed on one of the bearings 110 without dewatering the unit and without disassembly of the shaft 25. In preferred arrangements, the shaft couplings 40 are also positioned within the dry pits 90 to provide access to the couplings 40 if necessary.

A runner assembly 115 is attached to each of the dry pits 90 and includes a replacement runner 120 or turbine and a series of wicket gates 125 supported for movement between an open and a closed position. The replacement unit includes four single-flow runners 120 with each single-flow runner 120 replacing one set of the prior double opposed runners 23. Thus, while a similar runner design could be employed (e.g., Francis, Kaplan, Propeller, etc.) the runner 120 is typically larger to accommodate the additional flow through the runner 120 as each runner 120 must accommodate twice the flow of each of the prior runners 23.

Figure 5:
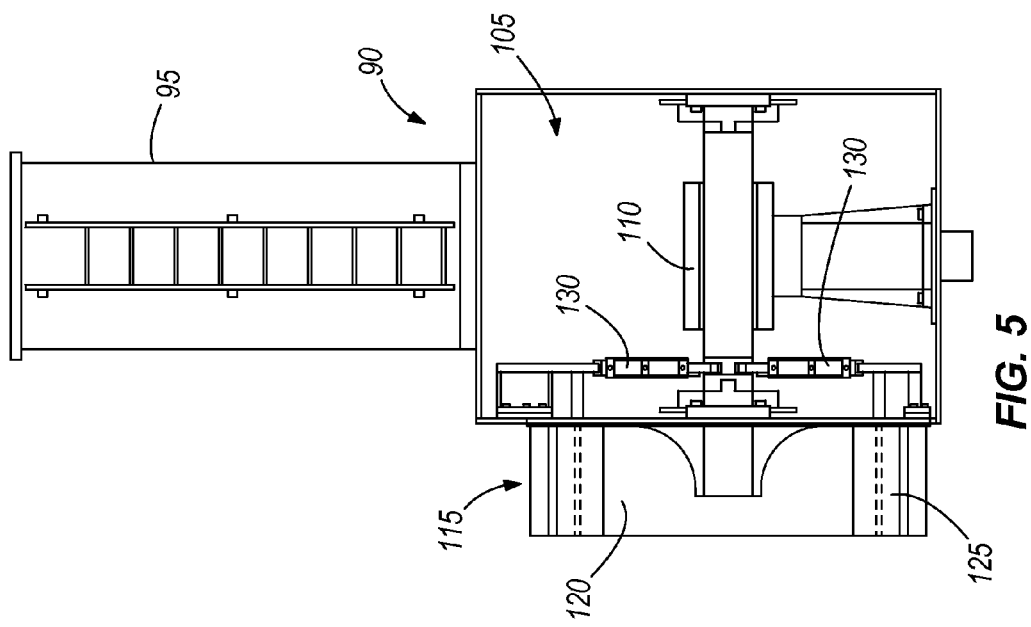
FIG. 5 is a front view of the dry pit of FIG. 4.

As illustrated in FIGS. 4 and 5, the wicket gates 125 are positioned around the outer circumference of the runner 120 and include a portion that extends into the adjacent dry pit 90 to provide for inspection during maintenance cycles or during operation. In addition, the linkage and hydraulic or electrical actuator 130 used to move the wicket gates 125 can be positioned within the dry pit 90. For example, in one arrangement each wicket gate 125 is supported on a shaft that extends through the wall of the dry pit 90. A common ring interconnects each shaft such that rotation of the ring produces a common rotation of each of the wicket gates 125 about their shaft axis. The ring, a portion of the wicket gate 125, and the linkages therebetween are disposed within the dry pit 90 to facilitate periodic lubrication and maintenance.

As illustrated in FIG. 4, the wicket gates 125 are movable between a closed position and an open position. After the flow of water passes through the wicket gates 125 and the runner 120, the flow is discharged into a draft chest assembly 135 (shown in FIG. 3) that receives only the flow from that particular runner 120. The draft chest 135 then discharges the water to the draft tube 45 and out through the tailrace.

Each of the draft chests 135 includes a pipe 140 that operates as a vacuum breaker as will be discussed. One end of the pipe 140 is positioned within the draft chest 135 and the opposite end is positioned above the water line 100. A valve 145 is positioned between the two ends to selectively provide fluid communication between the draft chest 80 and the atmosphere above the water line 100.

Figure 6:
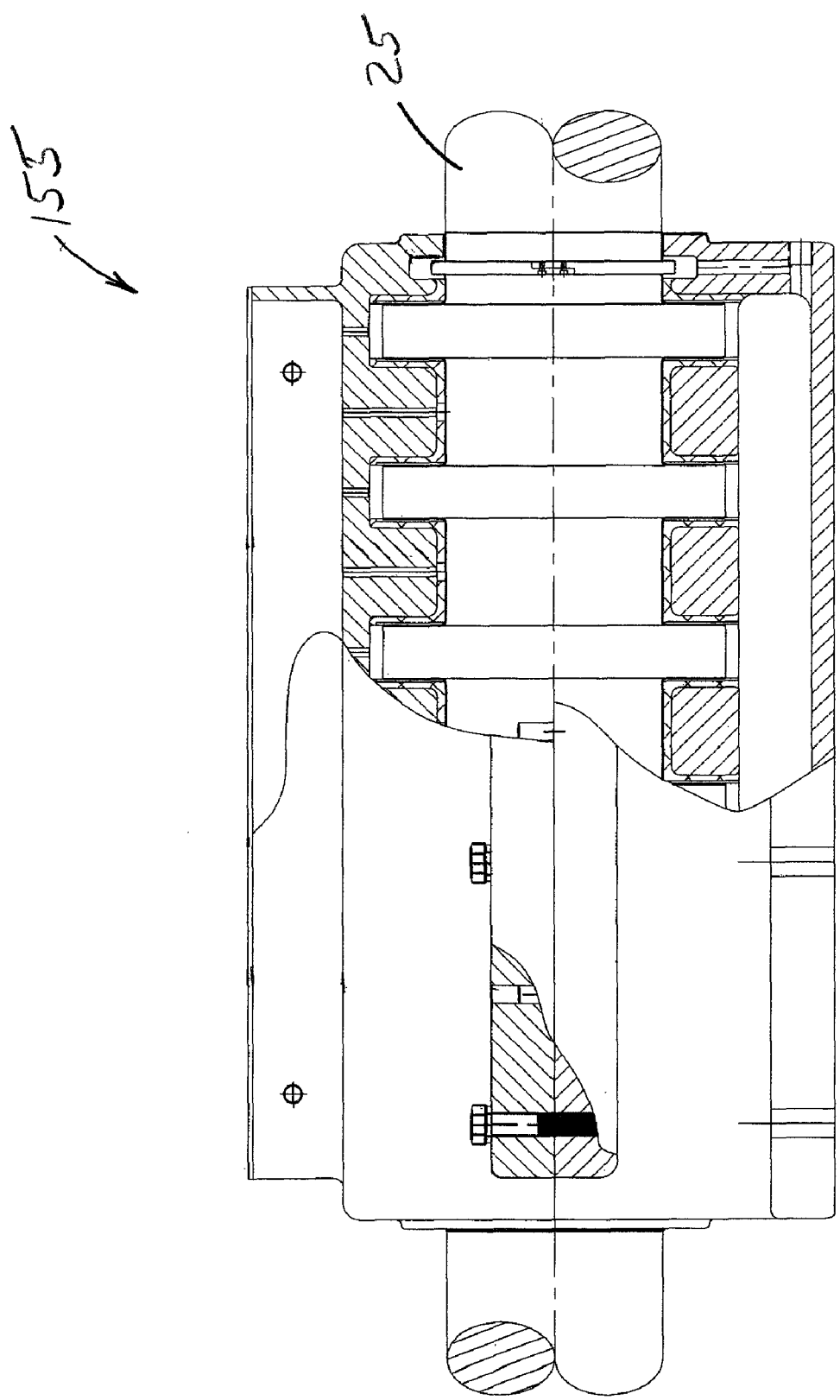
FIG. 6 is a partially broken away side view of a thrust bearing suitable for use in the replacement unit of FIG. 3.

A powerhouse dry pit 150 is positioned adjacent the outer wall of the powerhouse 15 to enlarge the space available for an improved thrust bearing 155. The powerhouse dry pit 150 defines an air space 160 sized to receive a coupling 165 and the improved thrust bearing 155. In preferred constructions, the thrust bearing 155 shown in FIG. 6, includes a dual action thrust bearing 155 that includes babbitted surfaces and oil lubrication. The thrust bearing 155 is larger than the prior thrust bearing due to an increase in operational flexibility as will be discussed below.

Once the replacement is complete, the new unit arrangement is able to operate more efficiently across a larger load range and requires less maintenance than the prior unit 10. The replacement is accomplished with virtually no changes being made to the existing foundation, thereby reducing the cost of implementing the replacement.

The replacement of eight runners 23 that discharged through four draft tubes 45 with four runners 120 that discharge through four draft tubes 45 improves the overall efficiency of the runners 120 and reduces turbulence downstream of the runners 120.

In addition, the operation of the wicket gates 125 for the individual runners 120 is separated with the upgraded design. Thus, all of the wicket gates 125 do not have to move in unison, thereby greatly enhancing the efficient operating range of the unit. In one construction, the control signal for the individual wicket gates 125 is transmitted to the individual wicket gate actuators 130 via an electrical signal or wireless signal, while others include a hydraulic connection or a combination thereof. For example, the prior arrangement was operable between 20 percent and 100 percent of full load. Following the replacement, the unit is operable between 20 percent of the load of one runner 120 (i.e., 5 percent of the total unit output) and 100 percent of full load. Thus, the unit can operate efficiently at much lower loads, such as may be desirable when water levels are low.

In addition to a wider load range, the unit can operate using only one runner 120, two runners 120, three runners 120, or all four as may be desired. The separate vacuum breakers 140 allow a runner 120 to operate in air. With the wicket gates 125 closed, the valve 145 in the vacuum breaker pipe 140 is opened to allow the water within the runner 120 and draft chest 135 to drain. In some arrangements, compressed air is directed to the runner 120 to assure that all of the water is removed and the runner 120 is operating in air. Depending on which runners 120 are operating, the thrust load can change significantly thereby requiring the larger dual acting thrust bearing 155. For example, if the two end runners 120 are receiving flow with the remaining runners 120 operating in air, the thrust would be somewhat balanced. However, if only the first end runner 120 or the first and second runners 120 from the left are operating, the trust would be significantly larger.

Thus, the invention provides, among other things, a replacement hydro turbine arrangement suited for replacing a multi-runner hydro turbine. Various features and advantages of the invention are set forth in the following claims.

What is claimed is:

1. A turbine replacement unit for replacement of at least one double runner horizontal submersible installation for a hydroelectric plant including at least one submerged coupling and at least one submerged bearing supported by a submerged bearing pedestal in which each of the two runners discharge a flow into a common draft tube, the replacement unit comprising:
    a single runner positioned to replace each of the two runners, the single runner receiving a flow and discharging the flow into the existing common draft tube;
    a series of wicket gates positioned adjacent the single runner and operable to control the volume of flow into the runner;
    a dry pit assembly positioned to surround the submerged pedestal and define an air space around the submerged pedestal;
    an oil-flooded bearing positioned on the pedestal to replace the submerged bearing;
    a vacuum breaker system operable to fill the runner and the existing common draft tube with air when the series of wicket gates is closed;
    a shaft supporting the runner for rotation and at least partially supported for rotation by the oil-flooded bearing; and
    a generator coupled to the shaft and operable to produce an electrical power in response to rotation of the shaft.

2. The turbine replacement unit of claim 1, further comprising an actuator operable to move the wicket gates, the actuator substantially disposed within the dry pit assembly.

3. The turbine replacement unit of claim 1, further comprising a dual-direction oil-lubricated thrust bearing arranged to accommodate the thrust produced by the single runner.

4. A turbine replacement unit for replacement of a horizontal submersible unit for a hydroelectric plant wherein the unit includes at least two double runners including synchronized wicket gates, the runners supported on a preexisting foundation and coupled to a common shaft supported by at least two submerged bearings supported by a first submerged bearing pedestal and a second submerged bearing pedestal in which a first existing runner and a second existing runner discharge into a first draft tube and a third existing runner and a fourth existing runner discharge into a second draft tube, the replacement unit comprising:
 a first dry pit assembly positioned around the first bearing pedestal and defining an air space around the first bearing pedestal;
 a first oil-flooded bearing positioned on the pedestal to replace one of the submerged bearings;
 a first replacement runner assembly connected to the first dry pit and including an inlet positioned to receive a first flow and an outlet positioned to discharge the first flow into the first draft tube, the first flow being the only flow into the first draft tube, the first replacement runner assembly including a first replacement runner;
 a first series of wicket gates positioned adjacent the first replacement runner and operable to control the volume of flow into the first replacement runner;
 a second dry pit assembly positioned around the second bearing pedestal and defining an air space around the second bearing pedestal;
 a second oil-flooded bearing positioned on the pedestal to replace the other of the submerged bearings;
 a second replacement runner assembly connected to the second dry pit and including an inlet positioned to receive a second flow and an outlet positioned to discharge the second flow into the second draft tube, the second flow being the only flow into the second draft tube, the second replacement runner assembly including a second replacement runner;
 a vacuum breaker system operable to fill the first replacement runner and the first draft tube with air when the first series of wicket gates is closed;
 a shaft supporting the first replacement runner and the second replacement runner for rotation and at least partially supported for rotation by the first oil-flooded bearing and the second oil-flooded bearing; and
 a generator coupled to the shaft and operable to produce an electrical power in response to rotation of the shaft.

5. The turbine replacement unit of claim 4, further comprising a dual-direction oil-lubricated thrust bearing arranged to accommodate the thrust produced by operation of the first replacement runner and the second replacement runner.

6. The turbine replacement unit of claim 4, further comprising a second series of wicket gates positioned adjacent the second replacement runner and operable to control the volume of flow into the second replacement runner, the first series of wicket gates being movable independent of the second series of wicket gates.

7. The turbine replacement unit of claim 6, further comprising a first actuator operable to move the first series of wicket gates and a second actuator operable to move the second series of wicket gates, the first actuator substantially disposed within the first dry pit assembly and the second actuator substantially disposed within the second dry pit assembly.

8. A method of replacing a horizontal submersible installation for a hydroelectric unit including at least two double runners including synchronized wicket gates, the runners supported on a preexisting foundation and coupled to a common shaft supported by at least two submerged bearings supported by a first submerged bearing pedestal and a second submerged bearing pedestal in which a first existing runner assembly and a second existing runner assembly discharge into a first draft tube and a third existing runner assembly and a fourth existing runner assembly discharge into a second draft tube, the method comprising:
 removing the first existing runner assembly and the second existing runner assembly;
 positioning a first dry pit assembly around the first submerged bearing pedestal to produce an air space around the first submerged bearing pedestal;
 connecting a first new runner assembly including a first new runner to the first dry pit assembly, the first new runner assembly arranged to receive a first flow and discharge the first flow into the first draft tube, the first flow being the only flow into the first draft tube;
 positioning a first oil-flooded bearing on the first bearing pedestal;
 removing the third existing runner assembly and the fourth existing runner assembly;
 positioning a second dry pit assembly around the second submerged bearing pedestal to produce an air space around the second submerged bearing pedestal;
 connecting a second new runner assembly including a second new runner to the second dry pit assembly, the second new runner assembly arranged to receive a second flow and discharge the second flow into the second draft tube, the second flow being the only flow into the second draft tube;
 positioning a second oil-flooded bearing on the second bearing pedestal;
 positioning a first series of wicket gates adjacent the first new runner to control the volume of flow through the first new runner;
 positioning a vacuum breaker system operable to fill the first new runner and the first draft tube with air when the first series of wicket gates is closed;
 supporting the first new runner and the second new runner on a shaft; and
 supporting the shaft on the first oil-flooded bearing and the second oil-flooded bearing.

9. The method of claim 8, further comprising closing the first series of wicket gates and admitting a quantity of air into the first new runner assembly and the first draft tube to operate the first new runner assembly in an air space.

10. The method of claim 8, further comprising positioning a second series of wicket gates adjacent the second new runner to control the volume of flow through the second new runner.

11. The method of claim 10, further comprising operating a first actuator to move the first series of wicket gates and operating a second actuator to move the second series of wicket gates, the first actuator substantially disposed within the first dry pit assembly and the second actuator disposed within the second dry pit assembly.

12. The method of claim 10, further comprising closing the second series of wicket gates and admitting a quantity of air into the second new runner assembly and the second draft tube to operate the second new runner assembly in an air space.

13. A turbine replacement unit for replacement of a horizontal submersible installation for a hydroelectric plant including at least two opposed double runners including synchronized wicket gates, a first existing runner and a second existing runner discharge flow into a first draft tube, and a third existing runner and a fourth existing runner discharge flow into a second draft tube, the replacement unit comprising:

a first dry pit assembly;

a second dry pit assembly;

a first replacement runner assembly connected to the first dry pit assembly and including an inlet positioned to receive a first flow and an outlet positioned to discharge the first flow into the first draft tube, the first flow being the only flow into the first draft tube, the first replacement runner assembly including a first replacement runner;

a second replacement runner assembly connected to the second dry pit assembly and including an inlet positioned to receive a second flow and an outlet positioned to discharge the second flow into the second draft tube, the second flow being the only flow into the second draft tube, the second replacement runner assembly including a second replacement runner;

a first series of wicket gates positioned adjacent the first replacement runner and operable to control the first flow into the first replacement runner;

a vacuum breaker system operable to fill the first replacement runner assembly and the first draft tube with air when the associated first series of wicket gates is closed; and a second series of wicket gates positioned adjacent the second replacement runner and operable to control the second flow into the second replacement runner, wherein the first series of wicket gates and the second series of wicket gates are movable independent of one another.

14. The turbine replacement unit of claim 13, further comprising a first actuator operable to move the first series of wicket gates and a second actuator operable to move the second series of wicket gates, the first actuator substantially disposed within the first dry pit assembly and the second actuator substantially disposed within the second dry pit assembly.

15. The turbine replacement unit of claim 13, further comprising a dual-direction oil-lubricated thrust bearing arranged to accommodate the thrust produced by operation of the first replacement runner and the second replacement runner.

16. The turbine replacement unit of claim 13, further comprising a generator and a shaft coupled to the generator, the first replacement runner and the second replacement runner.

17. The turbine replacement unit of claim 16, further comprising a first oil-flooded bearing disposed within the first dry pit assembly and a second oil-flooded bearing disposed within the second dry pit assembly, the bearings operable to at least partially support the shaft for rotation.

* * * * *